US012163484B2

(12) United States Patent
Sperry

(10) Patent No.: US 12,163,484 B2
(45) Date of Patent: Dec. 10, 2024

(54) PISTON, BLOCK ASSEMBLY, AND METHOD FOR COOLING

(71) Applicant: Cummins Inc., Columbus, IN (US)

(72) Inventor: Robert G. Sperry, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/265,154

(22) PCT Filed: Dec. 3, 2021

(86) PCT No.: PCT/US2021/061822

§ 371 (c)(1),
(2) Date: Jun. 2, 2023

(87) PCT Pub. No.: WO2022/120178

PCT Pub. Date: Jun. 9, 2022

(65) Prior Publication Data

US 2024/0011451 A1 Jan. 11, 2024

Related U.S. Application Data

(60) Provisional application No. 63/120,928, filed on Dec. 3, 2020.

(51) Int. Cl.
*F01P 3/10* (2006.01)
*F02F 3/22* (2006.01)
*F02F 3/28* (2006.01)

(52) U.S. Cl.
CPC . *F02F 3/22* (2013.01); *F02F 3/28* (2013.01)

(58) Field of Classification Search
CPC ........ F02F 3/16; F02F 3/20; F02F 3/22; F02F 3/225
See application file for complete search history.

(56) References Cited

U.S. PATENT DOCUMENTS 4,175,502 A 11/1979 Moebus
4,530,312 A 7/1985 Kanda et al.
(Continued)

FOREIGN PATENT DOCUMENTS

BE 718096 A 12/1968
DE 102010033881 A1 * 2/2012 .......... B23K 20/129
(Continued)

OTHER PUBLICATIONS

EP 1061249 B1 Description (Year: 2006).*
(Continued)

*Primary Examiner* — George C Jin
*Assistant Examiner* — Teuta B Holbrook
(74) *Attorney, Agent, or Firm* — Faegre Drinker Biddle & Reath LLP

(57) ABSTRACT

A piston can include a skirt, a crown, and a cooling gallery. The skirt can have an upper body portion. The crown can be formed at the upper body portion. A wall can be formed underneath the crown so as to define a cooling gallery within the piston. The cooling gallery includes cooling gallery peripheral portion and a cooling gallery central portion. The cooling gallery can be configured to receive and to retain an amount of cooling fluid and to cause movement thereof within the cooling gallery between a cooling gallery peripheral portion and a cooling gallery central portion as the piston travels between top dead center and bottom dead center so as to cool both the piston outer region and the piston center region.

19 Claims, 7 Drawing Sheets

(56) References Cited

U.S. PATENT DOCUMENTS

| | | | | | |
|---|---|---|---|---|---|
| 5,913,960 | A * | 6/1999 | Fletcher-Jones | F02F 3/16 92/219 |
| 6,223,701 | B1 | 5/2001 | Kruse | |
| 6,279,455 | B1 | 8/2001 | Kruse | |
| 9,404,439 | B2 | 8/2016 | Klein | |
| 10,247,133 | B2 | 4/2019 | Muscas | |
| 2009/0158925 | A1 * | 6/2009 | Scharp | F02F 3/003 123/193.6 |
| 2012/0037111 | A1 * | 2/2012 | Scharp | F02F 3/22 123/193.6 |
| 2012/0160204 | A1 * | 6/2012 | Scharp | F02F 3/22 123/193.6 |
| 2013/0104838 | A1 * | 5/2013 | Spangenberg | F02F 3/003 123/193.6 |
| 2013/0206094 | A1 * | 8/2013 | Azevedo | F02F 3/18 123/193.6 |
| 2014/0083390 | A1 | 3/2014 | Azevedo | |
| 2014/0290618 | A1 * | 10/2014 | Bischofberger | F02F 3/16 123/193.6 |
| 2015/0184613 | A1 * | 7/2015 | Linke | F02B 23/0672 123/41.35 |
| 2015/0322886 | A1 * | 11/2015 | Bischofberger | F02F 3/22 123/193.6 |
| 2015/0336223 | A1 * | 11/2015 | Azevedo | B23P 15/08 29/888.05 |
| 2016/0305365 | A1 * | 10/2016 | Schneider | B01J 31/38 |
| 2017/0138297 | A1 * | 5/2017 | Laqua | F02F 3/003 |
| 2017/0260927 | A1 * | 9/2017 | Weinenger | F02F 3/22 |
| 2018/0334992 | A1 * | 11/2018 | Matsuo | F02F 3/18 |
| 2019/0257265 | A1 * | 8/2019 | Lineton | F02F 3/10 |
| 2020/0173394 | A1 | 6/2020 | Shin | |

FOREIGN PATENT DOCUMENTS

| | | | | |
|---|---|---|---|---|
| DE | 102017205717 | A1 * | 10/2018 | |
| EP | 1061249 | B1 * | 6/2006 | F02F 3/003 |
| JP | 54-028949 | A | 3/1979 | |
| WO | 2016175446 | A1 | 11/2016 | |
| WO | WO-2017029186 | A1 * | 2/2017 | B22F 10/00 |

OTHER PUBLICATIONS

International Search Report and Written Opinion for International Patent Application No. PCT/US2021/061822, filed Dec. 3, 2021, mailed Jul. 11, 2022.

International Preliminary Report on Patentability received for PCT Patent Application No. PCT/US2021/061822, mailed on Jun. 15, 2023, 8 pages.

European Search Report for EP Patent Application No. 21216268.9, Issued on Oct. 9, 2024, 6 pages.

* cited by examiner

PISTON, BLOCK ASSEMBLY, AND METHOD FOR COOLING

CROSS-REFERENCE TO RELATED APPLICATION

This application claims the priority benefit of International Patent Application No. PCT/US2021/061822, Dec. 3, 2021, which claims priority to U.S. Provisional Application No. 63/120,928 filed on Dec. 3, 2020, the entire contents and disclosures of which are incorporated herein by reference.

GOVERNMENT SUPPORT CLAUSE

This invention was made with government support under Other Transaction Authority (OT) agreement number W56HZV-16-9-0001, awarded by the United States Army. The government has certain rights in the invention.

FIELD OF THE DISCLOSURE

The present disclosure generally relates to internal combustion engine piston design and, more particularly, to designs for a cooling gallery of such a piston.

BACKGROUND

Efficiency, durability, and manufacturability of components are each important considerations when designing an internal combustion engine. Certain innate limitations exist in efficiency, durability, and manufacturability of those components, and specifically with regard to pistons. Piston design can be difficult as various components within, as well as separate from, the piston experience repetitive movements and extreme conditions (e.g., high temperatures and pressures, rapid changes in temperature, pressure and direction, hard contact with other components, and so forth). Furthermore, certain designs may present inherent manufacturability difficulties, such as precise dimensions in restricted or difficult-to-access spaces.

Heat loss is one of the greatest energy losses in internal combustion engines. A significant portion of fuel energy used in an internal combustion engine is lost as heat transferred from a combustion chamber to its cooling fluid (e.g., oil). Complex processes involving the combustion chamber affect heat loss to the cylinder walls, including gas motion, turbulence levels, and spray-wall interaction. Thus, a reduction in this heat loss through the pistons results in an improvement to the engine's efficiency.

It is known that a reduction in the heat transfer through the piston can result in an increase in exhaust temperatures, which can be beneficial for the engine, after-treatment system, and waste heat recovery system. Engines with such features may be characterized as having low heat rejection, which minimizes heat rejections within a specific set of design constraints. With low heat rejection, further efficiencies may be achieved, for example, by reducing cooling system capacity and having a broader fuel tolerance, thus making the engine less vulnerable, lowering specific volume, and lowering weight, all of which increase efficiency of a broader propulsion system.

One approach to reduce heat transfer through pistons and promote cooling thereof is through analyzing the shape of components of the piston. Such components include a cooling gallery, which is a void (e.g., an empty volume) formed in the piston to facilitate cooling via movement of the cooling fluid (e.g., engine oil) within the cooling gallery. These cooling galleries are typically formed underneath a crown of the piston and cool the piston by absorbing heat caused by combustion in a corresponding combustion chamber of a direct injection (e.g., diesel) internal combustion engine. During operation, high temperatures develop at the center of the piston crown and the piston rings can become vulnerable to detrimental deformation if their temperatures are too high. Thus, a typical cooling gallery aims to cool at least these portions of a piston via two separate portions: a center cooling gallery and an outer cooling gallery surrounding the center cooling gallery. Typical applications of the cooling gallery include a cooling fluid (e.g., oil) moving therein. Effective movement of the cooling fluid within the cooling gallery leads to better cooling of the piston.

SUMMARY

The present disclosure generally relates to internal combustion engine piston design and, more particularly, to designs for a cooling gallery of such a piston. According to examples of the present disclosure, a piston includes a skirt, a crown, and a cooling gallery. The skirt has an upper body portion. The crown is formed at the upper body portion. A wall formed underneath the crown defines a cooling gallery. The cooling gallery is configured to receive and to retain an amount of cooling fluid and to cause movement thereof within the cooling gallery between a cooling gallery peripheral portion and a cooling gallery central portion as the piston travels between top dead center and bottom dead center so as to cool both a piston outer region and a piston center region.

In examples, the cooling gallery can be a single continuous volume. In examples, the wall can include a sloped floor portion, a sloped ceiling portion, the cooling gallery central portion, and the cooling gallery peripheral portion. Both the cooling gallery central portion and the cooling gallery peripheral portion can extend between the sloped floor portion and the sloped ceiling portion.

In examples, the wall can direct the amount of cooling fluid to move toward the cooling gallery peripheral portion when the piston is at top dead center, and the wall can direct the amount of cooling fluid to move toward the cooling gallery central portion when the piston is at bottom dead center. In examples, when the wall directs the amount of cooling fluid to move toward at least one of the cooling gallery central portion and the cooling gallery peripheral portion, the wall can direct the amount of cooling fluid to swirl. In examples, the wall can include at least one ridge protruding inwardly from a wall of the cooling gallery, and the wall can thereby direct the amount of fluid to swirl.

The present disclosure includes a block assembly that includes at least one cylinder and a piston. The piston is configured to reciprocate within the at least one cylinder. The piston includes a skirt having an upper body portion, a crown formed at the upper body portion, and a wall that is formed underneath the crown and defines a cooling gallery. The cooling gallery can be configured to receive and to retain an amount of cooling fluid and to cause movement thereof within the cooling gallery between a cooling gallery peripheral portion and a cooling gallery central portion as the piston travels between top dead center and bottom dead center so as to cool both a piston outer region and a piston center region.

The present disclosure includes a method of cooling a piston is disclosed. The method can include receiving and retaining an amount of cooling fluid within a cooling gallery. The method can include causing, as the piston travels toward top dead center, the amount of cooling fluid to move within the cooling gallery toward one of a cooling gallery central portion so as to cool a piston center region and a cooling gallery peripheral portion so as to cool a piston outer region. The method can include causing, as the piston travels toward bottom dead center, the amount of cooling fluid to move within the cooling gallery toward the other of the cooling gallery central portion so as to cool the piston center region and the cooling gallery peripheral portion so as to cool the piston outer region.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
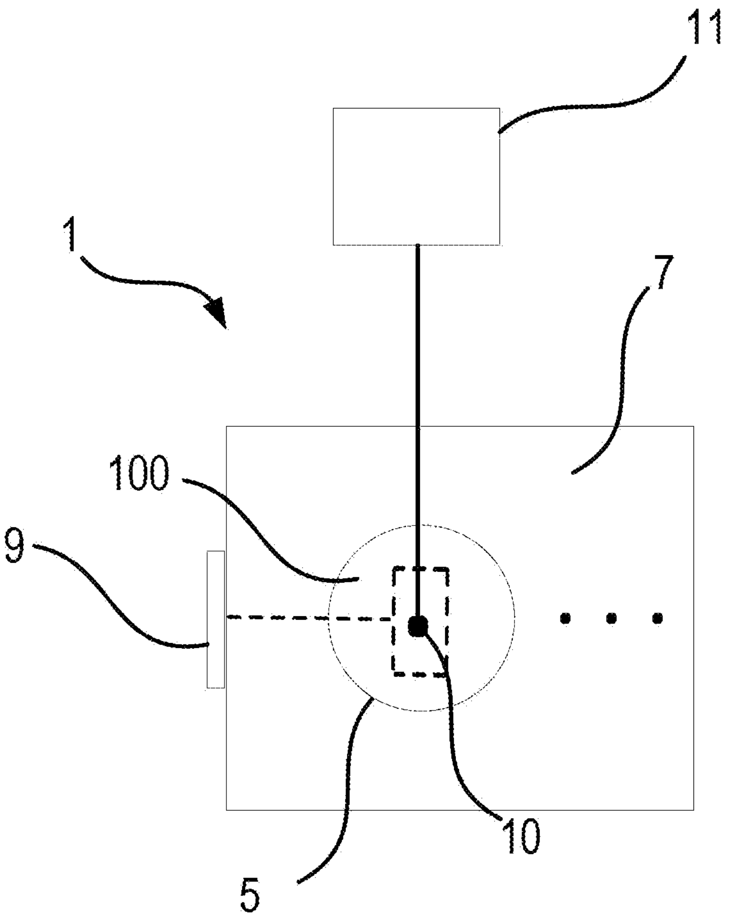
FIG. 1 is a schematic view of an engine.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS OF THE DISCLOSURE

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

FIG. 1 shows an engine 1, such as an internal combustion engine. As shown, the engine 1 includes at least one cylinder 5 with a piston 100 that is both snugly disposed and arranged for reciprocal movement therein. The engine 1 includes a block assembly 7 wherein the at least one cylinder 5 is formed. The block assembly 7 includes at least one piston 100 moveably received within the at least one cylinder 5. As described below, in various examples the present disclosure provides piston features and designs as well as components for engines, such as the engine 1, and operating techniques based on the piston features and designs. In examples, the block assembly 7 includes at least one cylinder 5 and a single piston 100 for each cylinder 5. In other examples, the block assembly 7 includes at least one cylinder 5 and a plurality of pistons 100 for each cylinder 5. These are just some examples of many example arrangements of cylinders 5 and pistons 100 in the engine 1. In any of these examples, the piston 100 includes a cooling gallery 110 that is defined by one or more wall portions (e.g., portions of an internal wall) of the piston 100 and is designed such that cooling fluid retained therein is allowed to slosh or otherwise move as the wall directs this flow of cooling fluid along the wall as the piston travels between top-dead-center ("TDC") and bottom-dead-center ("BDC"), including at or near both TDC and BDC.

As described in further detail below, the piston 100 can be configured to reciprocate within the at least one cylinder 5 during engine operation. As a general introduction with relation to the engine 1 and its components, movement of the piston 100 relative to the cylinder 5 can correspond to movement of a crankshaft 9 of the engine 1. The crankshaft 9 is movably received within the block assembly 7 and operatively connected to the piston 100 such that rotation of the crankshaft 9 causes translation of the piston 100 within the cylinder 5. In this regard, the block assembly 7 can include a crankshaft 9 that is operatively connected to the piston 100 so as to facilitate movement of the piston 100 from top dead center to bottom dead center and from bottom dead center to top dead center. In addition, or in alternative, the block assembly 7 can include a fuel injector 10 that is configured to receive fuel from a fuel source 11 and to spray the fuel into the at least one cylinder 5 for use in combustion within the at least one cylinder 5.

In operation, the engine 1 can perform one or more combustion cycles that cause the piston 100 to reciprocate within the cylinder 5. For instance, during an engine operation, a fuel injector 10 provides (directly or indirectly) controlled injections of fuel into the piston 100 (e.g., at a piston bowl), which, in a compression-ignition engine, results in combustion that is contained within a combustion chamber when the piston 100 is at or near TDC. This combustion at or near TDC then forces the piston 100 to move toward BDC. In continued operation, the piston 100 cyclically reciprocates between TDC and BDC in this manner at varying rates depending on user demand. This cyclic combustion heats the piston 100 and/or movement generates heat within the piston 100 either or both of which is then cooled by cooling fluid retained within the cooling gallery 110. By designing the cooling gallery 110, for example, to optimize the shape of cooling gallery 110 considering the reciprocal movement of the piston 100 within a cylinder 5 as described herein, cooling efficiency of the piston 100 may be increased.

Figure 2A:
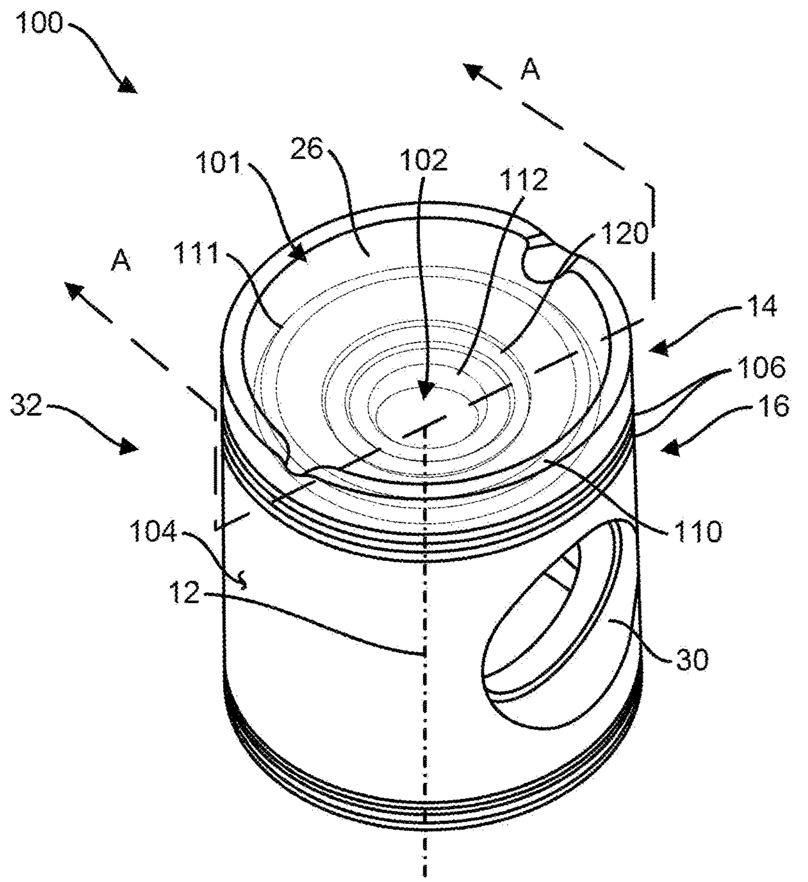
FIG. 2A is a perspective view of a piston, according to examples of the present disclosure.
Figure 2B:
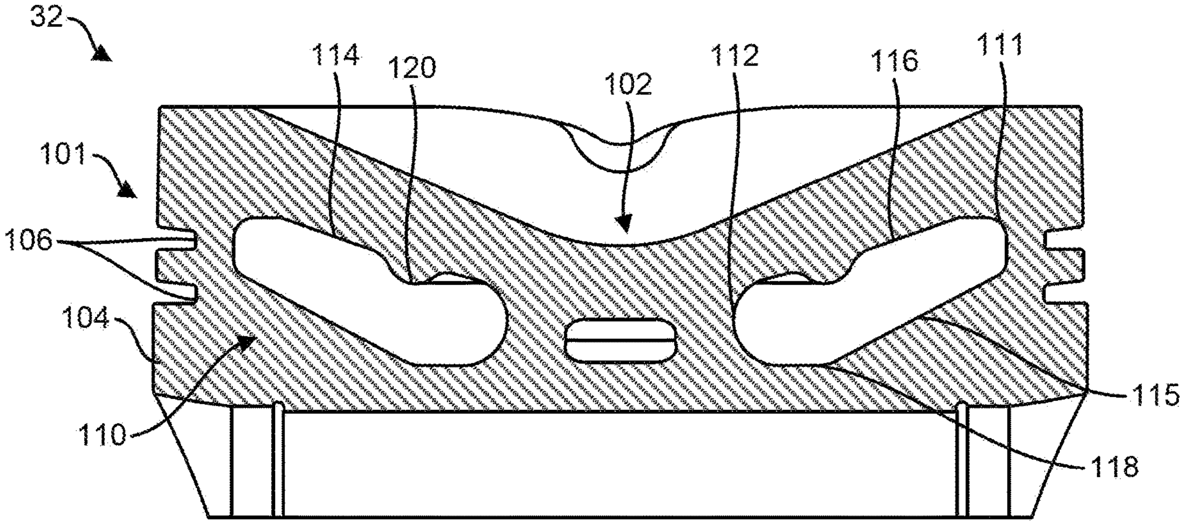
FIG. 2B is a cross sectional view taken at section A-A of FIG. 2A.
Figure 3A:
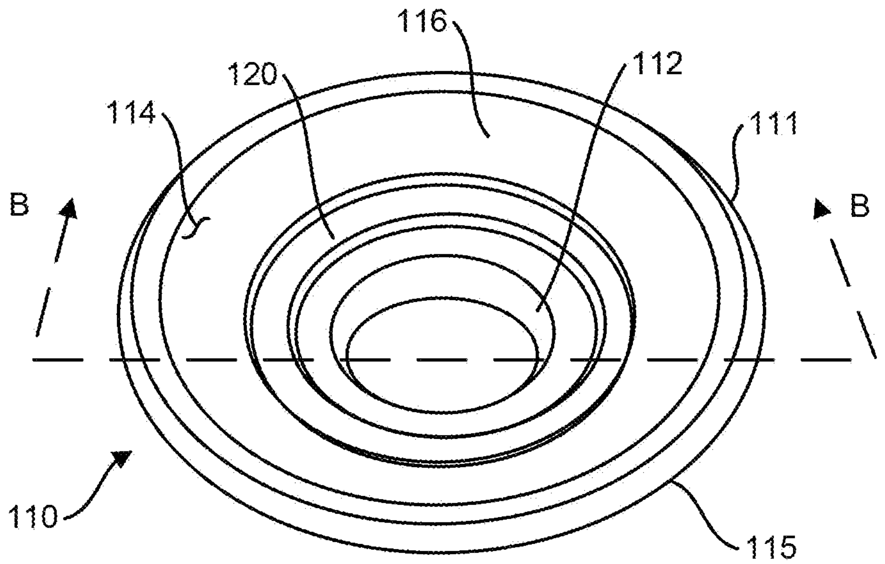
FIG. 3A is a cutaway view of the cooling gallery shown in FIG. 2A.
Figure 3B:
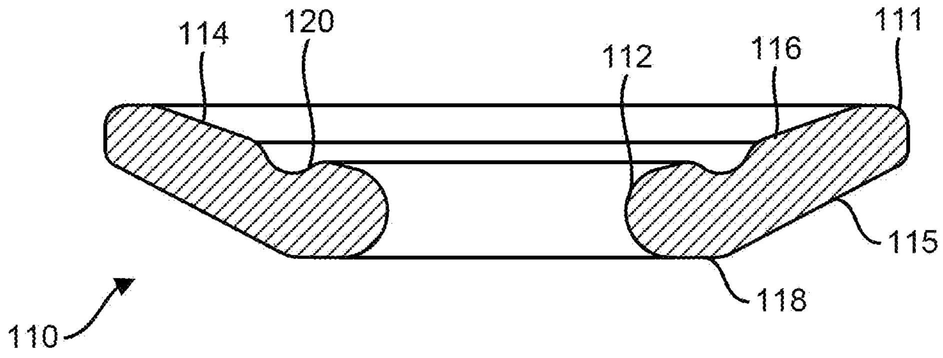
FIG. 3B is a cross sectional view taken at section B-B of FIG. 3A.

To this end, FIGS. 2A, 2B, 3A, and 3B show various views of components of a piston 100, according to principles of the present disclosure. Such pistons 100 include cooling galleries 110 that optimize cooling of the piston 100 throughout engine operation, including when the engine is at or near TDC and/or BDC. In particular, FIG. 2A shows a perspective view of the piston 100, according to examples of the present disclosure. FIG. 2B shows a cross sectional view taken at section A-A of FIG. 2A. FIG. 3A shows a cutaway view of the cooling gallery 110 shown in FIG. 2A. FIG. 3B shows a cross sectional view taken at section B-B of FIG. 3A. Such pistons 100 can be used in engines discussed above. More details of these pistons will be discussed in detail below.

As illustrated between these figures, the piston 100 includes a skirt 16 having an upper body portion 32, a crown 14 formed at the upper body portion 32, and a cooling gallery 110 formed via one or more voids underneath the crown 14 and in fluid communication with the at least one cylinder 5. In effect, the cooling gallery 110 is defined by wall portions (e.g., some or all of the wall 114) of the piston such that the cooling gallery is an internal volume or void formed within the piston 100. The cooling gallery 110 is thereby configured to receive and to retain an amount of cooling fluid. As described in further detail below, the wall 114 that defines the cooling gallery 110 can be configured to direct, cause, or otherwise facilitate movement of the cooling fluid within the cooling gallery 110 between a cooling gallery peripheral portion 111 and a cooling gallery central portion 112 as the piston 100 travels between TDC and BDC so as to cool both the piston outer region 101 and the piston center region 102.

In examples, the cooling gallery 110 can be a single continuous volume that is defined by the wall 114 of the piston. For instance, in examples the wall 114 continuously extends circumferentially within the piston 100 such that the cooling gallery 110 is a single continuous volume. During operation, the wall 114 of the piston 100 directs movement of cooling fluid within the cooling gallery 110 between a cooling gallery peripheral portion 111 and a cooling gallery central portion 112 as the piston 100 travels between and arrives at TDC and BDC. In this manner, the cooling gallery 110 facilitates cooling both of a piston outer region 101 and a piston center region 102. In addition to circumferential movement within the cooling gallery 110, having a cooling gallery 110 that is a single continuous volume promotes movement of the amount of cooling fluid throughout the cooling gallery 110. This phenomenon occurs at least because the cooling gallery peripheral portion 111 and the cooling gallery central portion 112 are in fluid communication with each other throughout operation. Alternatively, similar results can be achieved by a cooling gallery 110 having a plurality of continuous volumes, such as discrete volumes spaced circumferentially and/or radially about the piston 100.

The wall 114 of the piston can include a number of sloped and curved portions that define the cooling gallery 110. As illustrated, the cooling gallery 110 includes a wall 114 that has floor portions 115 and ceiling portions 116. For instance, in this regard, the wall 114 can direct the amount of cooling fluid to move toward the cooling gallery peripheral portion 111 when the cooling fluid travels along the ceiling portion 116 of the wall 114 in the direction from the piston center region 102 to the piston outer region 101. Moreover, the wall 114 can direct the amount of cooling fluid to move toward the cooling gallery central portion 112 when the cooling fluid travels along a floor portion 115 of the wall 114 in the direction from the piston outer region 101 to the piston center region 102.

In particular, the wall 114 as shown has a sloped floor portion 115, a sloped ceiling portion 116, the cooling gallery central portion 112, and the cooling gallery peripheral portion 111. Both the cooling gallery central portion 112 and the cooling gallery peripheral portion 111 extend between the sloped floor portion 115 and the sloped ceiling portion 116. To promote swirling the cooling fluid, for example, either or both of the cooling gallery central portion 112 and the cooling gallery peripheral portion 111 are curved. As such, as shown the cooling gallery central portion 112 and the cooling gallery peripheral portion 111 can be generally concave toward the sloped floor portion 115 and the sloped ceiling portion 116. In examples, the cooling gallery peripheral portion 111 can be positioned proximate the piston outer region 101, and the cooling gallery central portion 112 can be positioned proximate to the piston center region 102. As such, the cooling gallery peripheral portion 111 can be proximate to at least one piston ring groove 106 at an outer surface 104 of the skirt 16, and the cooling gallery central portion 112 can be proximate to a center of the bowl 26. In this manner, movement of the cooling fluid at the cooling gallery peripheral portion 111 cools the piston outer region 101, and movement of the cooling fluid at the cooling gallery central portion 112 cools the piston center region 102.

One or more slope angles can define the cooling gallery 110 sloped ceiling portion 116 and sloped floor portion 115 relative to the longitudinal axis 12 of the piston 100. As shown, both the sloped ceiling portion 116 and the sloped floor portion 115 slope downwardly from the cooling gallery peripheral portion 111 to the cooling gallery central portion 112. As well, the slope angle of the sloped ceiling portion 116 is different from the slope angle of the sloped floor portion 115. Of course, it is not beyond the scope of this disclosure for the slope angle for either or both of the cooling gallery peripheral portion 111 and the cooling gallery central portion 112 to be more or less than shown, in a different direction than shown, or to be the same magnitude rather than different magnitudes. For instance, certain cooling galleries 110 can have only a sloped floor portion 115 or a sloped ceiling portion 116. Likewise, certain cooling galleries 110 can have only one curved cooling gallery central portion 112 or cooling gallery peripheral portion 111.

In examples, an obstruction (e.g., a recess or protrusion) in the wall 114 of the cooling gallery can direct the amount of cooling fluid to swirl at certain portions within the cooling gallery 110. For instance, the wall 114 can swirl the amount of cooling fluid as it flows toward at least one of the cooling gallery central portion 112 and the cooling gallery peripheral portion 111. As illustrated, the wall 114 includes at least one ridge 120 protruding inwardly from the wall 114 that defines the cooling gallery 110. In this regard, the wall 114 can thereby direct the amount of cooling fluid to swirl by altering movement of the amount of cooling fluid along the wall 114 at the at least one ridge. Size, shape, and location of the ridge 120 may vary between examples.

With continued reference to FIGS. 2A, 2B, 3A, and 3B, the wall includes a ridge 120 having a generally curved profile. When the obstruction directs the amount of cooling fluid to swirl, the piston 100 can benefit from extended cooling occurring proximate to high-temperature or complex portions of the piston 100, such as the piston center region 102 (near the center of the piston bowl) and the at least one piston ring groove 106. Similar to the cooling gallery 110, in an example, the ridge 120 may be circumferentially extending through the piston 100. Opposite the ridge 120, in some examples, is a flattened portion 118 of the sloped floor portion 115. As can be seen, the flattened portion 118 can be at a different angle (e.g., a more orthogonal angle) relative to the longitudinal axis 12 than that of the sloped floor portion 115. In concert with the ridge 120, the flattened portion 118 may promote swirling the amount of cooling fluid within the cooling gallery 110.

The wall may include multiple ridges 120 spaced about the cooling gallery 110. Circumferential spacing, radial spacing, or both can define a plurality of ridges 120 within the cooling gallery 110. In examples, a first ridge of the at least one ridge 120 can be positioned proximate to the cooling gallery central portion 112. A second ridge can, for example, be proximate the cooling gallery peripheral portion 111. In examples, the first ridge is positioned at a sloped ceiling portion 116 of the cooling gallery 110 but can be positioned at the sloped floor portion 115 of the cooling gallery 110 in other examples. In examples, the second ridge can be positioned on the same or other of the sloped floor portion 115 and the sloped ceiling portion 116 as the first ridge.

Figure 4A:
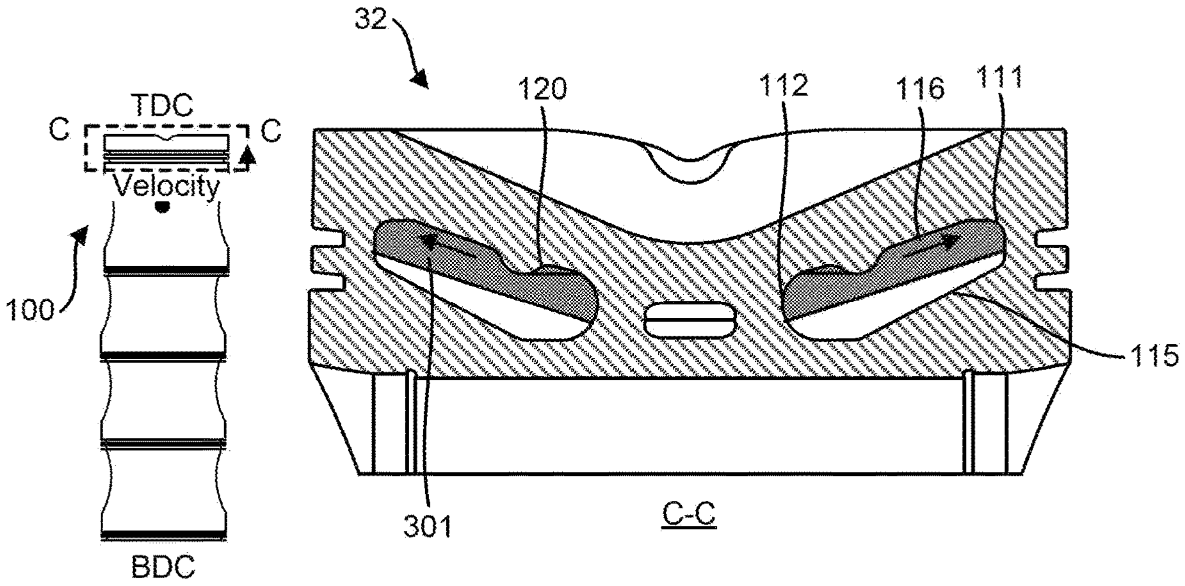
FIG. 4A is a diagram showing a cross sectional view of a piston retaining an amount of cooling fluid at a first stage of operation.
Figure 4B:
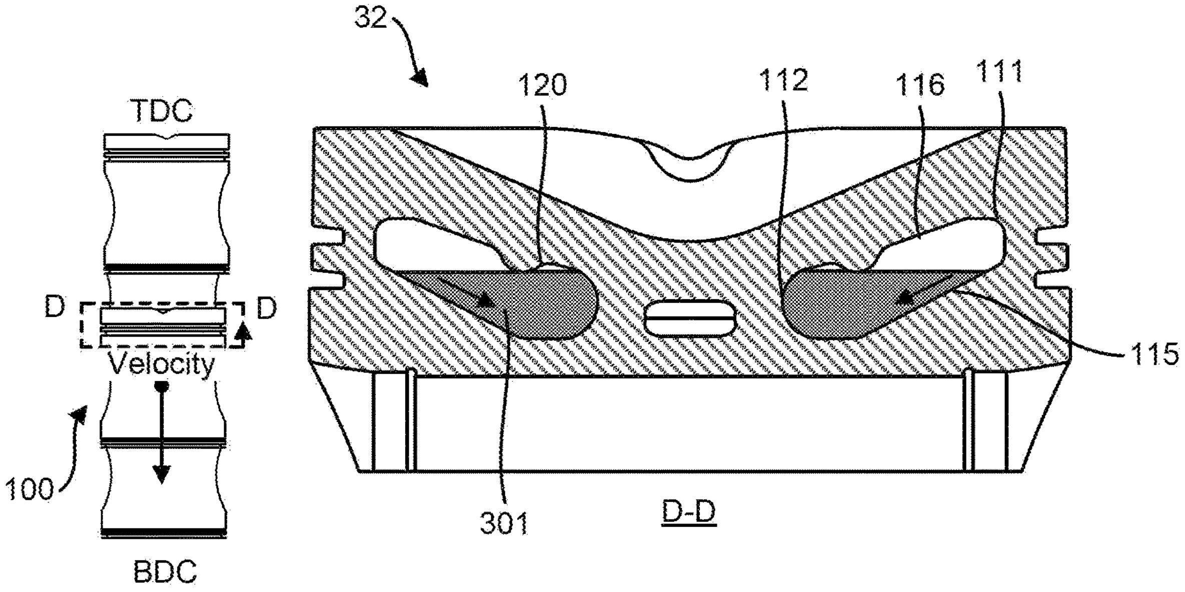
FIG. 4B is a diagram showing a cross sectional view of a piston retaining an amount of cooling fluid at a second stage of operation.
Figure 4C:
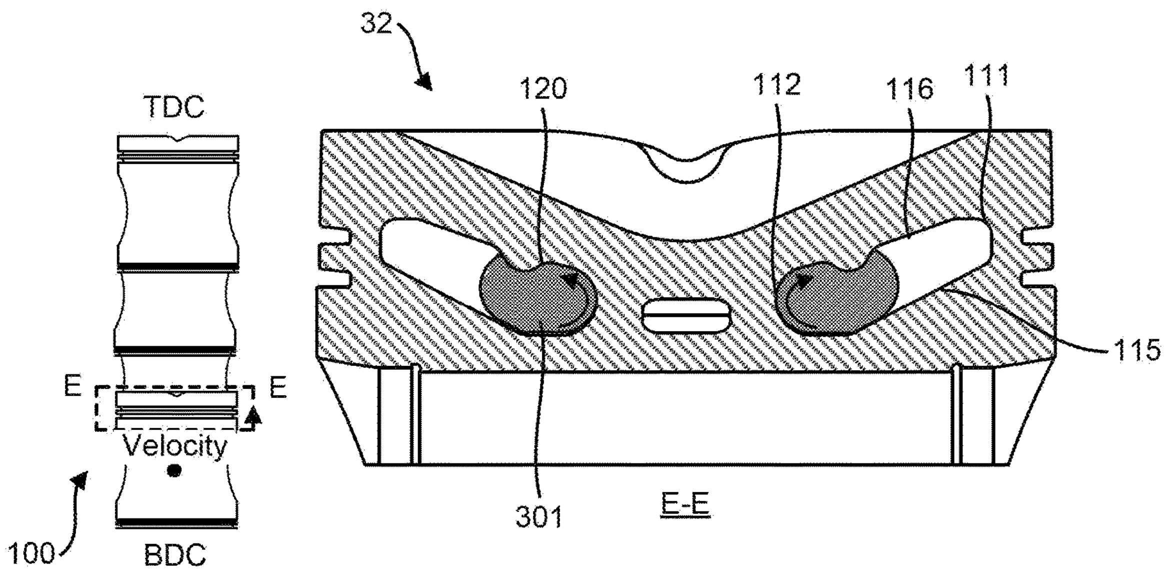
FIG. 4C is a diagram showing a cross sectional view of a piston retaining an amount of cooling fluid at a third stage of operation.
Figure 4D:
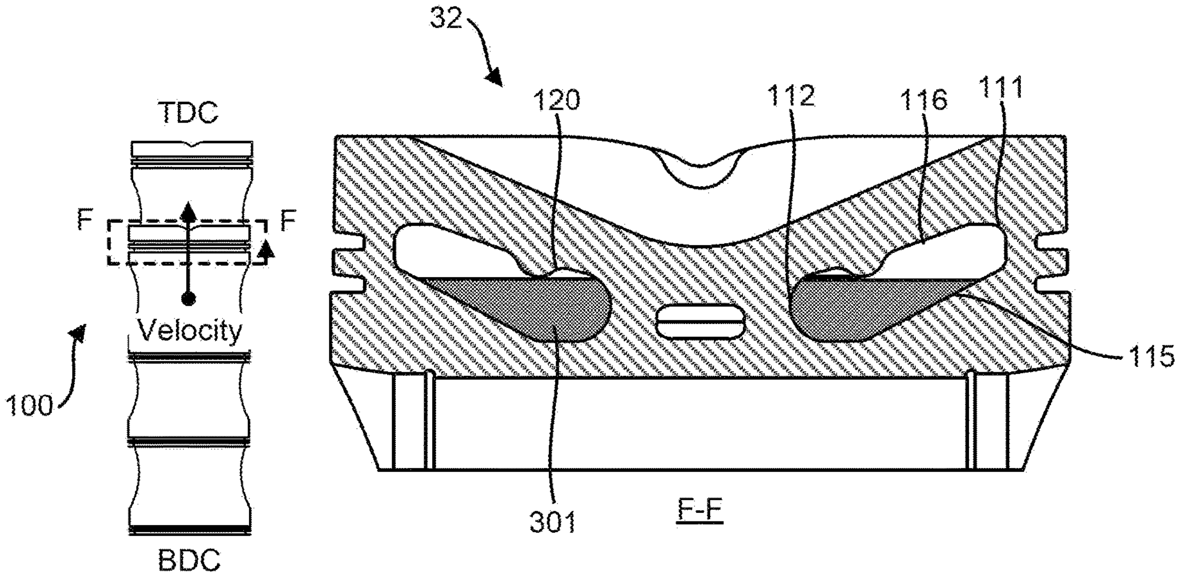
FIG. 4D is a diagram showing a cross sectional view of a piston retaining an amount of cooling fluid at a fourth stage of operation.

FIGS. 4A-4D show various stages of the cooling gallery 110 in operation, according to examples of the present disclosure. FIG. 4A shows a diagram with a cross sectional view of an upper body portion 32 of a piston 100 retaining an amount of cooling fluid 301 at a first stage of operation. FIG. 4B shows a diagram with a cross sectional view of an upper body portion 32 of a piston 100 retaining the amount of cooling fluid 301 at a second stage of operation. FIG. 4C shows a diagram with a cross sectional view of an upper body portion 32 of a piston 100 retaining the amount of cooling fluid 301 at a third stage of operation. FIG. 4D shows a diagram with a cross sectional view of an upper body portion 32 of a piston 100 retaining the amount of cooling fluid 301 at a fourth stage of operation. In each of these figures, the position of the piston 100 and the direction of velocity at which it reciprocates within a cylinder is shown on the left while the corresponding movement of the amount of cooling fluid 301 within the cooling gallery 110 is shown on the right. As well, in each of these figures except for FIG. 4D, arrows within the amount of cooling fluid 301 indicate movement of the amount of cooling fluid 301. In FIG. 4D, the cooling fluid 301 is generally stationary.

The four illustrated stages of operation generally cover one cycle of the piston 100 moving within a respective cylinder. In examples, the wall direct the amount of cooling fluid 301 to move toward the cooling gallery peripheral portion 111 when the piston 100 is approaching TDC, and the wall directs the amount of cooling fluid 301 to move toward the cooling gallery central portion 112 when the piston 100 is approaching BDC. Beginning with the first stage shown in FIG. 4A, the piston 100 is shown at TDC with the amount of cooling fluid 301 just past the ridge 120 and moving along the sloped ceiling portion 116 from the cooling gallery central portion 112 toward the cooling gallery peripheral portion 111. Next, in FIG. 4B, the piston 100 is shown moving downward, away from TDC and toward BDC, with the amount of cooling fluid 301 moving along the sloped floor portion 115 from the cooling gallery peripheral portion 111 toward the cooling gallery central portion 112. Next, in FIG. 4C, the piston 100 is shown at BDC with the amount of cooling fluid 301 swirling at the cooling gallery central portion 112 proximate to the ridge 120. Last, in FIG. 4D, the piston 100 is shown moving upward, away from BDC and toward TDC, with the amount of cooling fluid 301 being generally stationary. Of course, there may be designs in which the amount of cooling fluid 301 is not stationary at this stage, and such designs should not be considered outside of the scope of this disclosure. The examples of stages discussed here are just some of many examples. As well, cyclical movement of the piston 100 within the cylinder can cause these stages to repeat with each cycle.

Figure 5:
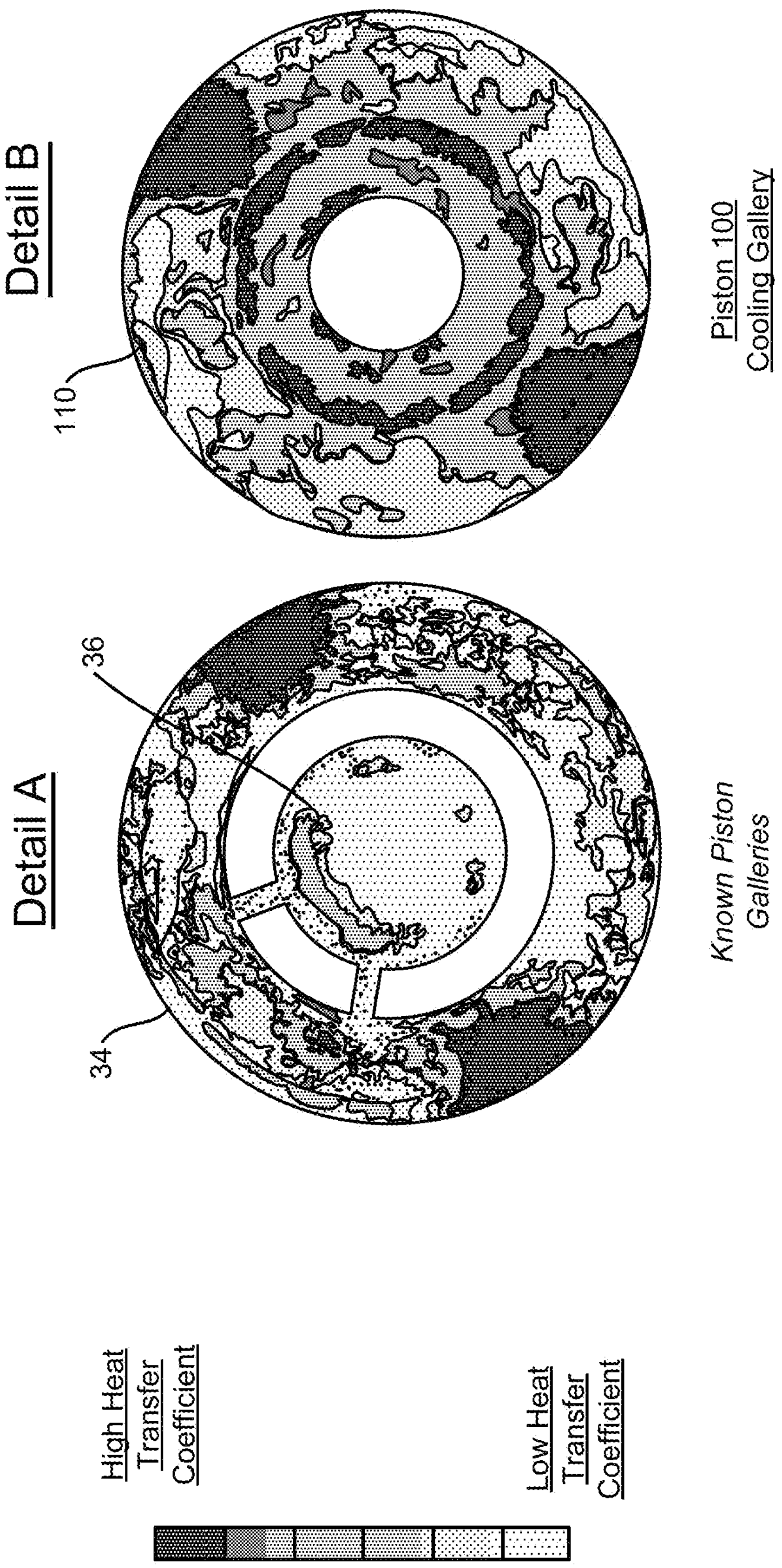
FIG. 5 is a heat transfer coefficient contour plot for known piston cooling galleries and a cooling gallery according to principles of the present disclosure.

FIG. 5 shows contour plots of heat transfer coefficients for various piston cooling galleries. As shown here, designs for the known piston typically include two separate cooling galleries, but do not include features of the present disclosure. The inner cooling gallery 36 is typically centrally disposed within the known piston, and the outer cooling gallery 34 is typically circumferentially extending through the known piston, around the inner cooling gallery 36. There may be some minimal allowance for fluid communication between the outer and inner galleries 34, 36 (as illustrated by the two channels between the outer and inner cooling galleries 34, 36, but these galleries often operate independently of each other. For example, the outer and inner cooling galleries 34, 36 are not in fluid communication such that at least a majority of an amount of cooling fluid contained therein is passed between these galleries to cool both an outer and central portion of the known piston, especially during one cycle between TDC and BDC. Rather, the outer and inner galleries 34, 36 are separately supplied with cooling fluid and, contrary to the designs described further below, are not designed to move the cooling fluid within the fluid gallery at all points of travel, especially at BDC. Even less, these galleries are not designed to promote additional cooling fluid movement when the known piston is at BDC. The unfortunate result of typical piston designs is an inadequate or suboptimal cooling of the known piston, each of which can lead to mechanical failures or limit engine performance over time.

In more detail regarding the contour plots, Detail A shows heat transfer coefficient contour plots for the outer and inner galleries 34, 36 of a known piston for comparison purposes to Detail B. In particular, Detail B shows heat transfer coefficient contour plots for piston cooling galleries similar to those discussed herein, including the cooling gallery 110 discussed in relation to FIGS. 2A, 2B, 3A, 3B, and 4A-4D. At the left of FIG. 5 is a scale indicating low heat transfer coefficients (e.g., of about 10,000 $W/m^2K$) to high heat transfer coefficients (e.g., of about 30,000 $W/m^2K$). Higher heat transfer coefficients translate into improved cooling in the respective area. In comparing Details A and B, it can be seen that the features of the cooling gallery 110 according to principles of the present disclosure show improved cooling throughout the cooling gallery 110 and, notably, proximate to the cooling gallery central portion 112. As well, whereas known piston galleries, which include separate outer and inner cooling galleries, maintained a gap without cooling between the inner cooling gallery 36 and outer cooling gallery 34, the cooling gallery 110 according to principles of the present disclosure does not. Thus, there can be significant cooling advantages to be gained by employing the principles of the present disclosure over known piston cooling galleries.

Figure 6:
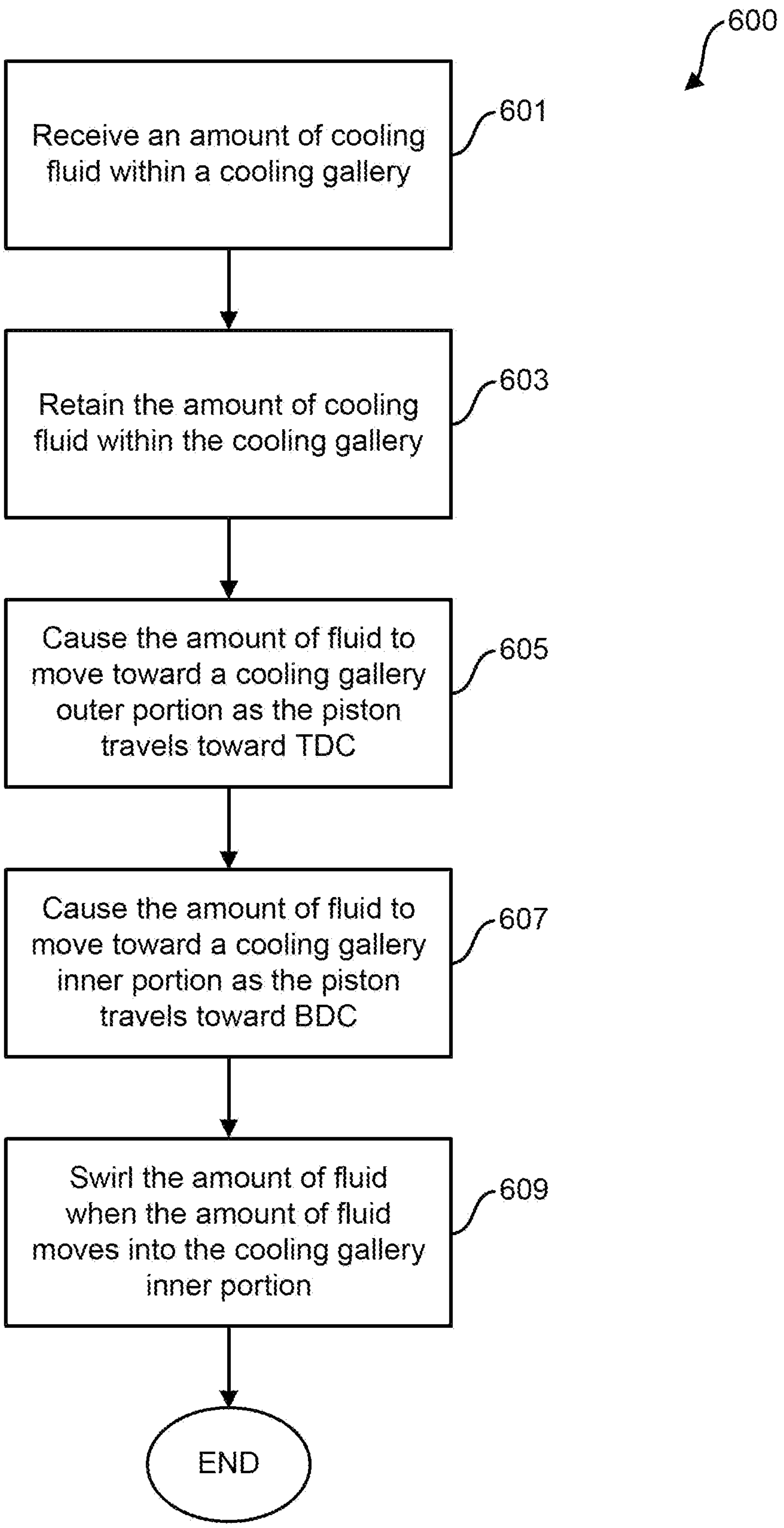
FIG. 6 is a flowchart of a method of cooling a piston, according to the present disclosure.

According to principles of the present disclosure, as shown in FIG. 6, a method 600 of cooling a piston is disclosed. The method 600 can include, at step 601, receiving an amount of cooling fluid within a cooling gallery and, at step 603, retaining the amount of cooling fluid within the cooling gallery. At step 605, the method 600 can include directing, as the piston travels toward TDC, the amount of cooling fluid to move within the cooling gallery toward one of a cooling gallery central portion so as to cool a piston center region and a cooling gallery peripheral portion so as to cool a piston outer region. At step 607, the method 600 can include directing, as the piston travels toward BDC, the amount of cooling fluid to move within the cooling gallery toward the other of the cooling gallery central portion so as to cool the piston center region and the cooling gallery peripheral portion so as to cool the piston outer region.

In examples, the method 600 can include, at step 609, swirling the amount of cooling fluid when the amount of cooling fluid moves into the cooling gallery central portion or the cooling gallery peripheral portion. In examples, swirling the amount of cooling fluid can include causing the amount of cooling fluid to move toward at least one ridge extending radially inward from a wall of the cooling gallery. In examples, swirling the amount of cooling fluid can occur when the amount of cooling fluid moves into the cooling gallery central portion. In examples, the amount of cooling fluid can move toward the cooling gallery central portion as the piston travels toward BDC, and the amount of cooling fluid can move toward the cooling gallery peripheral portion as the piston travels toward TDC. In this regard, directing, as the piston travels toward top dead center, the amount of cooling fluid to move within the cooling gallery toward one of a cooling gallery central portion so as to cool the piston center region and the cooling gallery peripheral portion so as to cool a piston outer region at step 605 can include moving the amount of cooling fluid toward the cooling gallery central portion as the piston travels toward bottom dead center. Moreover, directing, as the piston travels toward bottom dead center, the amount of cooling fluid to move within the cooling gallery toward the other of the cooling gallery central portion so as to cool the piston center region and the cooling gallery peripheral portion so as to cool the piston outer region at step 607 can include moving the amount of cooling fluid toward the cooling gallery peripheral portion as the piston travels toward top dead center.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

What is claimed is:

1. A piston having a piston outer region and a piston center region, the piston comprising:

a skirt having an upper body portion;

a crown formed at the upper body portion; and a wall formed underneath the crown so as to define an annular cooling gallery within the piston, the cooling gallery having a lateral length and a longitudinal height, wherein the lateral length is greater than the longitudinal height, the cooling gallery having a cooling gallery peripheral portion defining a first portion of the lateral length and a cooling gallery central portion defining a second portion of the lateral length, the cooling gallery configured to receive and to retain an amount of cooling fluid such that the wall directs movement of the cooling fluid within the cooling gallery between the cooling gallery peripheral portion and the cooling gallery central portion as the piston travels between top dead center and bottom dead center so as to cool both the piston outer region and the piston center region, the wall including a continuous annular ridge protruding into the cooling gallery from a ceiling portion of the wall, the ridge being continuous along an entire annular length of the cooling gallery.

2. The piston of claim 1, wherein the wall continuously extends circumferentially within the piston such that the cooling gallery is a single continuous volume.

3. The piston of claim 1, wherein when the amount of cooling fluid moves toward at least one of the cooling gallery central portion and the cooling gallery peripheral portion, the wall directs the amount of cooling fluid to swirl.

4. The piston of claim 3, wherein the ridge is positioned proximate to the cooling gallery central portion, such that the wall is configured to direct the amount of cooling fluid to swirl by altering movement of the amount of cooling fluid along the wall at the ridge.

5. The piston of claim 1, wherein the wall includes a sloped floor portion, a sloped ceiling portion, the cooling gallery central portion, and the cooling gallery peripheral portion, and wherein both the cooling gallery central portion and the cooling gallery peripheral portion extend between the sloped floor portion and the sloped ceiling portion.

6. The piston of claim 1, wherein the wall directs the amount of cooling fluid to move toward the cooling gallery peripheral portion when the cooling fluid travels along the ceiling portion of the wall in the direction from the piston center region to the piston outer region, and wherein the wall directs the amount of cooling fluid to move toward the cooling gallery central portion when the cooling fluid travels along a floor portion of the wall in the direction from the piston outer region to the piston center region.

7. The piston of claim 1, wherein the piston further includes at least one piston ring groove and the skirt further includes an outer surface, and wherein the piston ring groove is formed in the outer surface and the cooling gallery peripheral portion is positioned proximate to the piston ring groove.

8. The piston of claim 1, wherein a bowl of the piston is axisymmetric about a central longitudinal axis of the piston.

9. The piston of claim 1, wherein the cooling gallery central portion and the cooling gallery peripheral portion are concave.

10. A block assembly, comprising:

at least one cylinder; and a piston configured to reciprocate within the at least one cylinder, the piston having a piston outer region and a piston center region, the piston comprising:

a skirt having an upper body portion;

a crown formed at the upper body portion; and a wall formed underneath the crown so as to define a cooling gallery within the piston, the cooling gallery having a lateral length and a longitudinal height, wherein the lateral length is greater than the longitudinal height, the cooling gallery further having a cooling gallery peripheral portion defining a first portion of the lateral length and a cooling gallery central portion defining a second portion of the lateral length, the cooling gallery configured to receive and to retain an amount of cooling fluid such that the wall directs movement of the cooling fluid within the cooling gallery between the cooling gallery peripheral portion and the cooling gallery central portion as the piston travels between top dead center and bottom dead center so as to cool both the piston outer region and the piston center region, the wall including a continuous annular ridge protruding into the cooling gallery from a ceiling of the wall, the ridge being continuous along an entire annular length of the cooling gallery.

11. The block assembly of claim 10, further comprising at least one of:

a crankshaft that is operatively connected to the piston so as to facilitate movement of the piston from top dead center to bottom dead center and from bottom dead center to top dead center; and a fuel injector that is configured to receive fuel from a fuel source and to spray the fuel into the at least one cylinder for combustion within the at least one cylinder.

12. The block assembly of claim 10, wherein the wall directs the amount of cooling fluid to move toward the cooling gallery peripheral portion when the piston is approaching top dead center, and wherein the wall directs the amount of cooling fluid to move toward the cooling gallery central portion when the piston is approaching bottom dead center.

13. The block assembly of claim 10, wherein the wall includes a sloped floor portion, a sloped ceiling portion, the cooling gallery central portion, and the cooling gallery peripheral portion, and wherein both the cooling gallery central portion and the cooling gallery peripheral portion extend between the sloped floor portion and the sloped ceiling portion.

14. The block assembly of claim 10, the wall is configured to swirl the amount of cooling fluid as the amount of cooling fluid flows toward at least one of the cooling gallery central portion and the cooling gallery peripheral portion.

15. The block assembly of claim 10, wherein the ridge that protrudes inwardly from the ceiling of the cooling gallery causes the amount of cooling fluid to swirl, the ridge positioned proximate to one of the cooling gallery central portion and the cooling gallery outer portion.

16. A method of cooling a piston, the method comprising:

receiving and retaining an amount of cooling fluid within a cooling gallery having a lateral length and a longitudinal height, wherein the lateral length is greater than the longitudinal height, the cooling gallery defined at least in part by a wall having a continuous annular ridge protruding into the cooling gallery from a ceiling of the wall, the ridge being continuous along an entire annular length of the cooling gallery;

directing, as the piston travels toward top dead center, the amount of cooling fluid to move within the cooling gallery toward one of a cooling gallery central portion so as to cool a piston center region and a cooling gallery peripheral portion so as to cool a piston outer region; and directing, as the piston travels toward bottom dead center, the amount of cooling fluid to move within the cooling gallery toward the other of the cooling gallery central portion so as to cool the piston center region and the cooling gallery peripheral piston so as to cool the piston outer region.

17. The method of claim 16, further comprising swirling the amount of cooling fluid when the amount of cooling fluid moves into the cooling gallery central portion or the cooling gallery peripheral portion by causing the amount of cooling fluid to move toward at least one ridge extending radially inward from a wall of the cooling gallery.

18. The method of claim 17, wherein swirling the amount of cooling fluid occurs when the amount of cooling fluid moves into the cooling gallery central portion.

19. The method of any claim 16, wherein directing, as the piston travels toward top dead center, the amount of cooling fluid to move within the cooling gallery toward one of the cooling gallery central portion so as to cool the piston center region and the cooling gallery peripheral portion so as to cool the piston outer region comprises moving the amount of cooling fluid toward the cooling gallery central portion as the piston travels toward bottom dead center; and wherein directing, as the piston travels toward bottom dead center, the amount of cooling fluid to move within the cooling gallery toward the other of the cooling gallery central portion so as to cool the piston center region and the cooling gallery peripheral portion so as to cool the piston outer region includes moving the amount of cooling fluid toward the cooling gallery peripheral portion as the piston travels toward top dead center.

* * * * *